(12) United States Patent
Holbeche

(10) Patent No.: US 8,960,222 B2
(45) Date of Patent: Feb. 24, 2015

(54) CLOSURE DEVICE

(75) Inventor: Thomas Bickford Holbeche, Church Crookham (GB)

(73) Assignee: Linde Aktiengesellschaft, Munich (DE)

( * ) Notice: Subject to any disclaimer, the term of this patent is extended or adjusted under 35 U.S.C. 154(b) by 726 days.

(21) Appl. No.: 13/181,541

(22) Filed: Jul. 13, 2011

(65) Prior Publication Data

US 2012/0181287 A1     Jul. 19, 2012

(30) Foreign Application Priority Data

Jul. 20, 2010   (GB) .................................. 1012154.9

(51) Int. Cl.
*F17C 13/04*     (2006.01)
*G05D 16/10*     (2006.01)

(52) U.S. Cl.
CPC ......... *F17C 13/04* (2013.01); *F17C 2201/0109* (2013.01); *F17C 2201/058* (2013.01); *F17C 2203/0617* (2013.01); *F17C 2205/0314* (2013.01); *F17C 2205/0329* (2013.01); *F17C 2205/0335* (2013.01); *F17C 2205/0338* (2013.01); *F17C 2205/035* (2013.01); *F17C 2205/0382* (2013.01); *F17C 2205/0385* (2013.01); *F17C 2221/011* (2013.01); *F17C 2221/017* (2013.01); *F17C 2223/0123* (2013.01); *F17C 2223/036* (2013.01); *F17C 2223/045* (2013.01); *F17C 2227/044* (2013.01); *F17C 2250/0694* (2013.01); *F17C 2270/0736* (2013.01)
USPC ............ 137/505.11; 137/505.25; 137/614.21; 222/3

(58) Field of Classification Search
CPC ............... F17C 13/04; F17C 2201/058; F17C 2205/0332; F17C 2205/0335; F17C 2205/0338; F17C 2205/0382; F17C 2207/0736; G05D 16/10; G05D 16/103
USPC ......... 137/68.19, 116.3, 505.11, 505.25, 613, 137/614.19, 614.21; 222/3
See application file for complete search history.

(56) References Cited

U.S. PATENT DOCUMENTS

| | | | |
|---|---|---|---|
| 3,511,266 A | | 5/1970 | Phlipot |
| 3,848,631 A | * | 11/1974 | Fallon ...................... 137/505.11 |
| 4,370,997 A | * | 2/1983 | Braithwaite et al. ....... 137/116.3 |
| 4,655,246 A | * | 4/1987 | Phlipot et al. ............ 137/505.11 |
| 4,924,904 A | * | 5/1990 | Carter ...................... 137/505.11 |

(Continued)

FOREIGN PATENT DOCUMENTS

| | | |
|---|---|---|
| AT | 398 465 B | 12/1994 |
| EP | 0 908 807 A1 | 4/1999 |

(Continued)

OTHER PUBLICATIONS

International Search Report for PCT/GB2011/001052, Date of Mailing: Nov. 21, 2011, Authorized Officer: Thomas Ott, 15 pp.

*Primary Examiner* — John Rivell
(74) *Attorney, Agent, or Firm* — David A. Hey

(57) ABSTRACT

A closure device for a container of compressed gas, particularly a capsule having a water capacity in the range of 5 to 100 ml, comprises a shut-off valve 122 and a pressure-reducing valve 120, particularly a pressure regulating valve. The shut-off valve 122 is on the lower pressure side of the pressure-reducing valve 120. The closure device may also comprise a fill valve 118 to enable the container to be recharged with gas.

18 Claims, 5 Drawing Sheets

(56) References Cited

U.S. PATENT DOCUMENTS

| | | | |
|---|---|---|---|
| 4,971,110 A * | 11/1990 | Cato | 251/149.6 |
| 5,566,713 A * | 10/1996 | Lhomer et al. | 137/613 |
| 6,615,865 B1 * | 9/2003 | Eusebi | 137/505.25 |
| 6,851,447 B1 * | 2/2005 | Carroll | 137/505.25 |
| 7,013,916 B1 * | 3/2006 | Pearlstein et al. | 137/613 |
| 7,334,598 B1 | 2/2008 | Hollars | |
| 7,481,241 B2 * | 1/2009 | Carpenter et al. | 137/505.25 |
| 7,748,407 B2 * | 7/2010 | Colby | 222/3 |
| 2001/0029979 A1 | 10/2001 | Zheng et al. | |
| 2002/0050142 A1 * | 5/2002 | Wang et al. | 62/48.1 |
| 2005/0205133 A1 | 9/2005 | Schneider | |
| 2009/0078321 A1 * | 3/2009 | Arnott et al. | 137/505.47 |
| 2009/0223580 A1 | 9/2009 | Denis et al. | |
| 2010/0326561 A1 | 12/2010 | Moretti et al. | |

FOREIGN PATENT DOCUMENTS

| | | |
|---|---|---|
| EP | 1 515 080 A2 | 3/2005 |
| EP | 2 236 905 A1 | 10/2010 |
| GB | 1 439 197 | 6/1976 |

* cited by examiner

CLOSURE DEVICE

FIELD OF THE INVENTION

This invention relates to closure device for a container of compressed gas, particularly such a container which is of a sufficiently small size that it is able to be carried about the person or is able to be loaded in or fitted to a handheld device that delivers gas therefrom.

BACKGROUND OF THE INVENTION

It has been known for 100 years or more to store compressed gases in a gas cylinder. A conventional gas cylinder is relatively large and is not capable of being carried in comfort about the person or of being loaded into a handheld device. The gas cylinder typically stores gas at a pressure of up to 300 bar. The gas may be a permanent gas, in which case it remains in the gaseous phase, or a non-permanent gas which can be liquefied by the application of a sufficiently large pressure. The gas cylinder is closed by a shut-off valve. The valve is able to be opened manually to release the gas. Typically, although the gas is stored at a very high pressure, it is not required at such pressure. The user therefore typically fits a pressure regulator or other pressure-reducing valve to the cylinder in order to reduce the delivery pressure to a suitable value. The pressure reducing valve is therefore located downstream of the shut-off valve. Typical shut-off valves are configured so as to enable the cylinder to be filled. More recently, cylinder valves with integrated pressure regulators have been used. In all these cases the fill valve and the pressure regulator are downstream of the shut-off valve.

If the container of compressed gas is required to be fitted to a small, typically hand-held device, for example a soda-siphon or a cream whipper, a conventional thermal gas cylinder fitted with a cylinder valve is not used. Instead, the necessary gas is contained under pressure in a capsule having a water capacity of up to 100 ml. The capsule normally has a closure in the form of a pierceable seal. The capsule is engaged with a device including a hollow needle that pierces the seal in order to deliver gas. Such arrangements are generally used either when the gas concerned is a non-permanent gas stored primarily in the liquid state, or when it is desirable to release the gas as quickly as possible. In the former example, the rate of delivery of gas is limited by the rate at which the gas vaporises. The need for a downstream pressure reducing valve, for example a pressure regulator, is therefore typically reduced. In the latter example, the need to deliver the gas as quickly as possible for example, to inflatable devices such as air bags, means that a pressure-reducing valve should not be used.

There is, however, a need for a closure device for a small container of compressed gas which makes possible delivery of the gas at a reduced pressure and which avoids the use of pierceable or puncturable seals, such seals rendering the reuse of the containers sufficiently inconvenient for them normally to be thrown away.

SUMMARY OF THE INVENTION

According to the present invention there is provided a closure device for a container of compressed gas, the closure device comprising a shut-off valve and a pressure-reducing valve, characterised in that the shut-off valve is located on the lower pressure side of the pressure-reducing valve.

The invention also provides a container of compressed gas, typically a capsule or other container that is able to be held in the hand, the container being fitted with a closure device according to the invention.

The closure device and container according to the invention are suitable for the storage of either a permanent gas or a non-permanent gas.

The pressure-reducing valve is typically a pressure regulator.

The closure device comprises an external body housing the shut-off valve and the pressure-reducing valve, the external body being engagable with the container of compressed gas.

The external body comprises a first member engagable with the container of compressed gas and having a gas inlet and a second member including an outlet for the gas and housing the shut-off valve. The external body defines a passageway between the inlet and the outlet.

The terms "inlet" and "outlet" are used herein with reference to the closure device when it is being used to deliver gas to an appliance or the like.

The first member of the external body has a first internal chamber housing a fill valve including an internal body member, the first internal chamber communicating with the interior of the container when the closure device is an engagement therewith.

The first member of the external body typically has a fill port communicating with the first internal chamber.

The said inner body member typically cooperates with a spring-loaded O-ring sealing member to seal the fill port from the interior of the container when the closure is an engagement therewith, the O-ring sealing member being displaceable from its sealing position against the spring-loading by a gas pressure applied to the filling port.

Typically there is retaining nut for retaining the inner body member in position.

The inner body member defines part of the passageway between the said inlet and the said outlet.

The internal body member defines a seat for the pressure-reducing valve.

The first internal chamber typically communicates with a bursting disc housed in the first external body member.

There are a number of possible configurations for the pressure-reducing valve in order for it to act to regulate the downstream pressure. In one such arrangement, the pressure-reducing valve comprises an inner cap housed within the valve body, the inner cap bounding in part a second internal chamber within the valve body, the second internal chamber being in communication with the said inlet when the pressure-reducing valve is open; and a spring-loaded piston contained within the valve body, the piston comprising a piston head and a piston rod, the piston rod including a conduit forming part of the said passageway and providing communication between the second internal chamber and a gas space defined between the piston head and the shut-off valve, wherein the piston is operable to move between a closed configuration in which the piston rod prevents communication between the gas inlet and the second internal chamber and an open configuration in which the piston rod permits communication between the gas inlet and the second internal chamber.

In a preferred embodiment, the piston head is in a sealing engagement with the valve body via a piston head seal and the piston rod is in a sealing engagement with the inner cap via a piston rod seal contained within the second internal chamber, the piston rod seal being held in a fixed position within the chamber. Such an arrangement makes it possible to keep down the diameter of the piston rod and therefore facilitates the manufacture of the closure device to a size suitable for a container that it is capable of being held in the hand.

The first external body member typically comprises a collar, and the piston rod and seal is held between the collar and the inner gap. The main gas passageway typically extends through the collar. In such an arrangement, a first part of the main passageway terminates in an orifice adjacent to the second internal chamber, and the piston rod comprises a sealing pin at an end remote from the piston head, the piston rod being arrangement within the external body so that the sealing pin seals the orifice when the piston is in the closed position.

The tip of the sealing pin is conveniently chamfered to a point, and the piston rod is arranged within the external body so that the tip of the sealing pin enters into and seals the orifice when the piston is in the closed position. The chamfering of the tip of the sealing pin and the arrangement of the piston rod within the valve body are such that the sealing pin is typically caused to be centred within the orifice as the tip of the sealing pin enters the orifice when the piston moves from the open position to the closed position.

The orifice typically has a diameter of approximately 0.3 mm.

The pressure reducing valve typically further comprises a compression spring ranged within the external body to bias the piston towards the open position.

The compression spring typically encircles the inner cap and extends between a surface of the inner cap and a surface of the piston head.

A recess may be provided in the piston head and the compression spring may extend between the surface of the inner cap into the recess.

Typically the inner cap is in a sealing engagement with the first external body member via an inner cap seal, whereby build up of pressure within the second internal chamber, in the event it occurs, is operable to cause the said sealing arrangement to break, enabling the gas within the second internal chamber to be vented via a relief aperture provided in the second external body member.

The shut-off valve typically comprises a spring-loaded head which when the shut-off valve is in a closed position makes a sealing engagement with a valve seat via a shut-off valve seal, but which is displaceable against the bias of the spring to open the shut-off valve.

The spring of the shut-off valve is typically is a disc spring.

The inlet to the main passageway may receive a purge tube which extends into the container and terminates therein at a position remote from the closure device.

Typically, the closure device is in welded engagement with the container.

BRIEF DESCRIPTION OF THE DRAWINGS

A closure device and container according to the invention will now be described by way of example with reference to the accompanying drawings in which.

The drawings are not to scale.

DETAILED DESCRIPTION OF THE DRAWINGS

Figure 1:
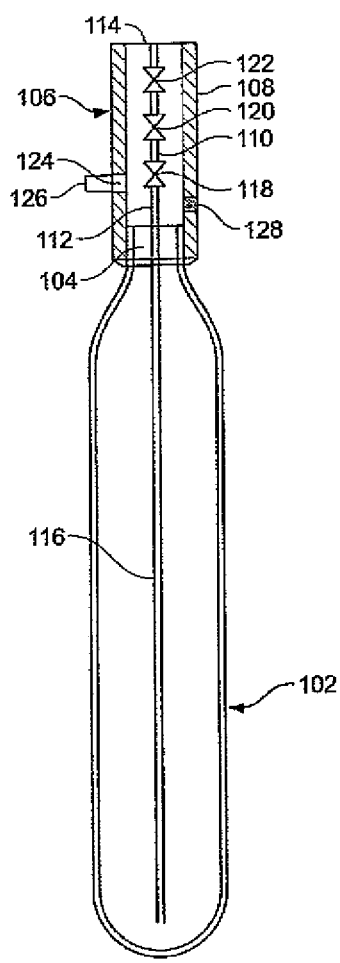
FIG. 1 is schema illustrating a typical configuration of the closure device.

Referring to FIG. 1, there is shown a capsule 102 adapted to store compressed gas at elevated pressure. The chosen elevated pressure if the compressed gas is a permanent gas, for example, helium or oxygen or mixtures of helium and oxygen, maybe in the order of 190 bar, but may be higher or lower. Non-permanent gases, for example, carbon dioxide or nitrous oxide, are typically stored at lower pressures in the range of 50-100 bar. The capsule 102 is typically of a size and shape such that it may readily held in an adult human hand. It typically has a water capacity in the range of 5-100 ml, but larger sizes are possible.

As shown in FIG. 1, the capsule 102 is typically generally cylindrical in shape. It is formed with a mouth 104. The capsule 102 is provided with a closure device 106. The closure device 106 has an external body 108 welded or otherwise secured (for example, by screw threads) fluid-tight to the external surface of the capsule 102 defining the mouth 104. The external body 108 of the closure device 106 typically has a diameter no greater than 20 mm at its widest point.

The body 108 has a passageway 110 extending axially therethrough between an inlet 112 communicating with the interior of the capsule 102 and an outlet 114 which typically has a configuration that enables the combination of the capsule 102 and the closure device 106 to be connected to a user device. In one example, the user device may be a hand-held generator of a non-thermal gaseous plasma. In another example, the user device may be a pair of nasal cannulae for administering oxygen or a life sustaining mixture of helium and oxygen to a person experiencing breathing difficulties. If desired, the user device (not shown) may be configured such that when mated with the outlet 114 of the closure device 106 it is effective to open the closure device 106 and thereby cause delivery of gas to the user device.

The inlet 112 to the passageway 110 may receive a purge tube 116 which extends into the interior of the gas capsule and terminates therein at a region remote from the mouth 104, typically a region close to the bottom of the interior of the capsule 102.

The external body 108 of the closure device 106 houses three different valves, namely a fill valve 118, a pressure-regulating (or pressure-reducing) valve 120, and a shut-off valve 122. The pressure-regulating valve 120 is located upstream of the shut-off valve 122. In other words, the shut-off valve 122 is on the lower pressure side of the pressure-regulating valve 120. On the other hand, the fill valve 118 is on the higher pressure side of the pressure regulating valve 120.

When the fill valve 118 is closed it shuts off communication between the interior of the capsule 102 and a fill port 124 formed at the external surface of the body 108. When the fill valve 118 is open, however, communication between the fill port 124 and the interior of the capsule 102 is essentially unimpeded. In both the open position and the closed position of the fill valve 118 there is communication between the interior of the capsule 102 and the upstream or high pressure side of the pressure-regulating valve 120.

The pressure-regulating valve 120 has a configuration which distributes forces acting on a valve member (not shown in FIG. 1) of the pressure-reducing valve 120 in a valve-opening direction and are those acting in a valve-closing direction such that the effect of the absolute value of the gas pressure in the capsule 102 is relatively small and therefore changes in that pressure have only a relatively small, if any, effect on the downstream gas pressure delivered by the combination of the capsule 102 and closure device 106. In this way, the pressure-reducing valve, acts to regulate the downstream pressure.

The configuration of the pressure regulator 120 may be such as to deliver a chosen pressure in the range of 1 bar to 3 bar absolute substantially independently of the pressure in the capsule 102.

The shut-off valve 122 typically has a valve member (not shown in FIG. 1) which is biased into a valve-closing position by the pressure of a spring (also not shown in FIG. 1). When the shut-off valve 122 is in the closed position, the pressure-regulating valve 120 closes of its own accord.

As previously described, connection of the closure device 106 to a user device (not shown) causes a force to be applied to the shut-off valve 122 to hold it open against the bias of the aforementioned spring. Gas will then be delivered from the capsule. Gas will then be delivered from the capsule 102 to the user device.

When the gas capsule 102 is exhausted, it may be refilled through the fill port 124. If desired, a nozzle 126 (or other connector) may be fitted in the fill port 124 to enable the capsule 102 to be connected to a source (not shown in FIG. 1) of refill gas under a suitable pressure. Refill gas thus flows into the capsule 102 in order to re-charge it. The arrangement is typically such that the refill gas enters via refill passages (not shown in FIG. 1) formed in the closure device 104. If the refill gas is of a different composition from the gas with which the capsule 102 was previously charged, the shut-off valve 122 may be held in an open position. As a result, the refill gas displaces residual gas from the capsule 102 through the purge tube 116 and out of the fill valve 118. When a volume of gas approximately equal to the water capacity of the capsule 102 has been displaced therefore by the refill gas, the shut-off valve 122 may be allowed to close, thus ending purging. Continued flow of the refill gas into the capsule 102 causes it to be charged with the refill gas. When a chosen pressure has been reached, the source of refill gas may be removed and the refill valve 118 allowed to close.

The closure device 106 is typically fitted with a bursting disc 128 which bursts to relieve the pressure in the capsule 102 should an excess of pressure be generated therein. The bursting disc 128 is thus able to communicate with the interior of the capsule 102 at all times, irrespective of the positioning of any of the valves 118, 120 and 122.

Figure 2:
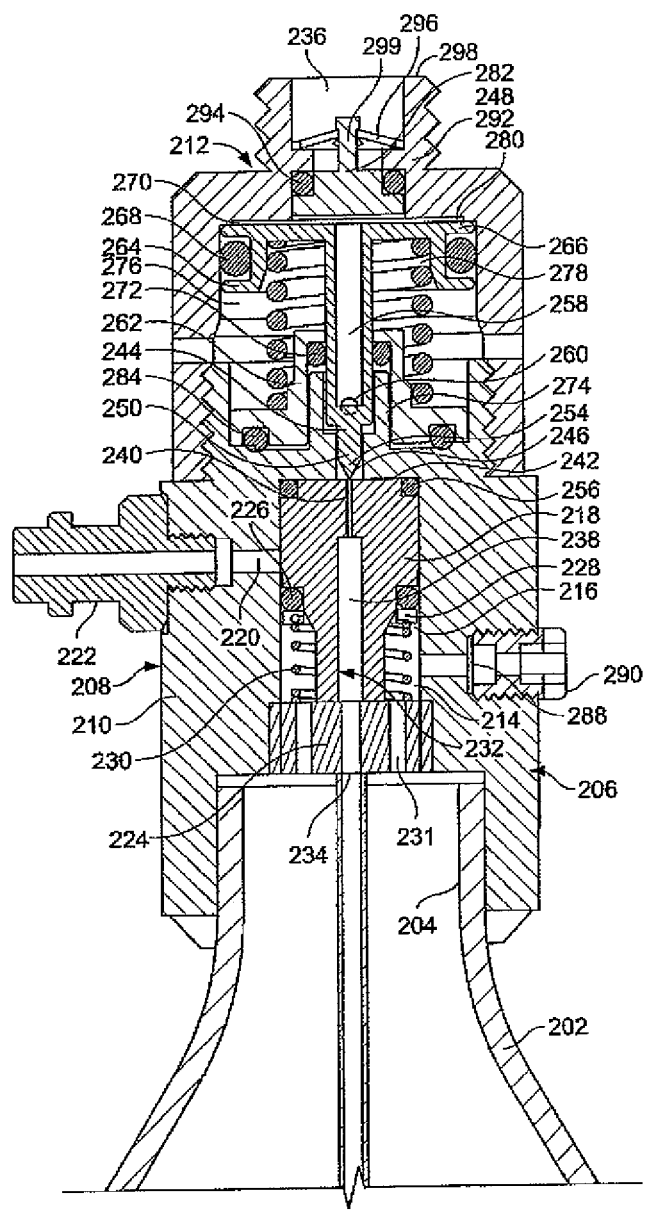
FIG. 2 is a schematic sectional elevation of one embodiment of the kind of closure device shown in FIG. 1.
Figure 3:
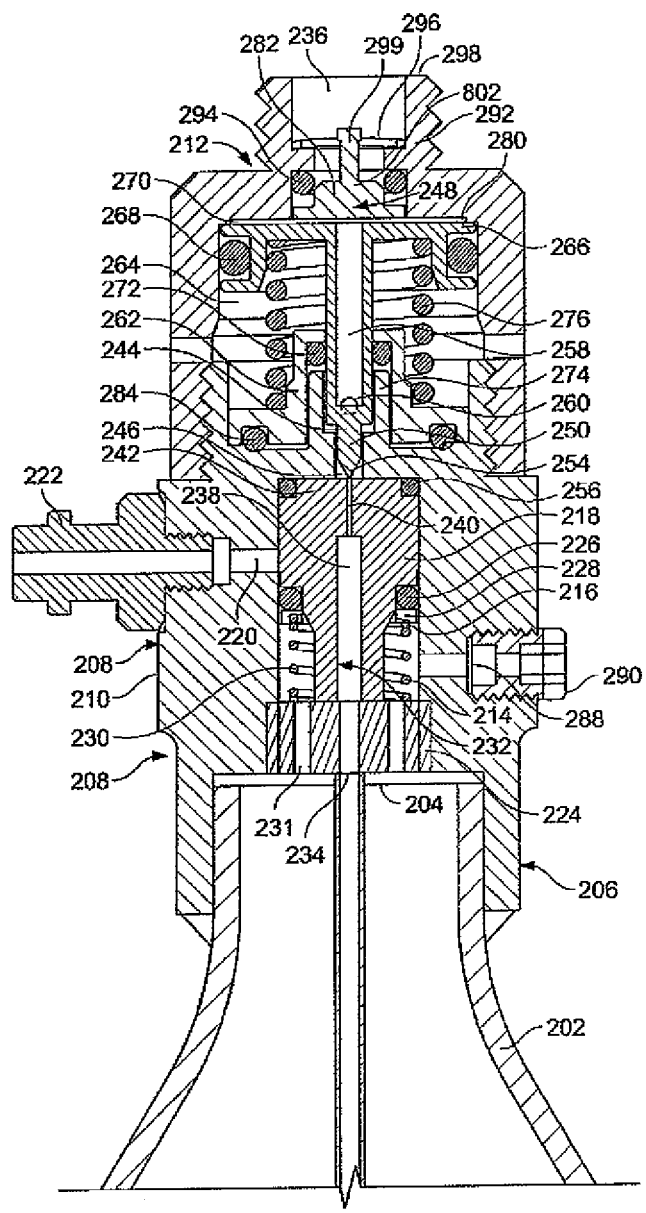
FIG. 3 is a schematic sectional elevation of a second embodiment of the kind of closure device shown in FIG. 1.

Referring now to FIGS. 2 and 3, there is shown one particular embodiment of the kind of arrangement illustrated in FIG. 1. There is thus shown in FIG. 2 a capsule 202 for the storage of a permanent or non-permanent gas essentially similar to the capsule 102 shown in FIG. 1. The capsule 202 has a mouth 204. A closure device 206 engages in a fluid-tight manner the external surface of the mouth 204 of the capsule 202. There may be a screw-threaded or welded seal therebetween. The welded seal may be made by TIG welding. When full, the pressure in the gas capsule may be in the order of 190 bar if the gas to be stored therein is a permanent gas. Higher or lower storage pressures may, however, be used.

The closure device 206 comprises an external body 208. The external body 208 comprises a first body member 210 that effects the engagement between the mouth 204 of the capsule 202 and the closure device 206. The first body member 210 engages a second body member 212. The first body member 210 has a first internal chamber 214 housing a fill valve 216 which includes an inner body member 218. The first internal chamber 214 communicates with the interior of the capsule 202. The first external body member 210 has a fill port 220 communicating with the first internal chamber 214.

As shown in FIG. 2, the fill port 220 is fitted with a nozzle 222 which is able to be connected to a source (not shown) of pressurised refill gas.

The inner body member 218 is retained in position by a retaining nut 224 which engages the first body member 210. The inner body member 218 is formed with a recess which locates an O-ring sealing member 226 that seals against a displaceable annular backing member 228. The backing member 228 is urged by a compression spring 230 into a position in which the O-ring sealing member 226 prevents communication between the first internal chamber 214, and hence the interior of the capsule 202, and the fill port 220 if no refill gas pressure is applied to the fill port 220. On the other hand, if a source of refill gas is connected to the nozzle 222 and a sufficient gas pressure is brought to bear on the remote side of the O-ring sealing member 226 relative to the backing member 228, the pressure causes the O-ring to be displaced towards the gas capsule to a location at which it no longer makes sealing engagement with the inner body member 218. Refill gas is thus able then to flow into the first internal chamber 214. In the arrangement shown in FIG. 2, the internal chamber 214 communicates with the interior of the gas capsule via passages 231 formed in the retaining nut 224. (In an alternative arrangement, not shown, the passages 231 can be omitted and the first internal chamber can communicate with the second part 238 of the axial passageway referred to hereinbelow.) Refill gas is thus able to enter the interior of the gas capsule 202. Once the refill gas pressure is removed, the bias of the compression spring 230 urges the O-ring sealing member 226 back into a fill-valve sealing position.

The closure device 206 has an axial passageway 232 that extends between an inlet 234 provided through the centre of the retaining nut 224 to an outlet 236 provided in the second external body member 212. A first part of the passageway 232 extends through the retaining nut 224. The first part of the axial passageway 232 is in register with a second part 238 formed axially through the inner body member 218. The second part 238 of the axial passageway 232 terminates at its end more remote from the capsule 202 in a narrow orifice 240. The orifice 240 is formed in a face 242 of the inner body member 218 and has a circular rim which forms the seat of a pressure regulating valve 244 which typically takes the form of a needle valve. The seating arrangement for the needle (or pin) depends on its configuration. The pressure regulating valve 244 determines the pressure of which gas issues from the closure device 206. When the pressure regulating valve 244 is open, gas passes from the orifice 240 into a bore (or second chamber) 246 of the first body member 210, the bore 246 forming a third part of the passageway 232. The bore 246 communicates with a shut-off valve 248 in an outlet region of the closure device 206. The orifice 240 is provided in the centre of the face 242 of the inner body member 218. The orifice 240 has a narrower bore that the rest of the second part 238 of the axial passageway 232. The orifice 240 typically has a diameter of 0.2-0.3 mm. This size is close to the limit of size of hole that can be commercially drilled or moulded, without special arrangements and excessive cost. The second part 238 of the axial passageway 232 can be made by drilling from the end of the inner body member 218 remote from the orifice 240. This arrangement simplifies manufacturing as it enables an orifice 240 with a narrow bore to be provided in the inner body member 218. In alternative embodiments, the inner body member 218 can be made entirely as a moulding so as to reduce cost, particularly at higher manufacturing volumes.

Referring again to FIGS. 2 and 3 of the drawings, the pressure regulating valve 244 has an axially displaceable valve member in the form of a sealing pin (or needle) 250. The pin is guided by the bore 246 of the first body member 210, which bore 246 forms part of the axial passageway 232. The pin 250 has a chamfered tip 254 which is adapted to make a sealing engagement with the mouth of the orifice 240. In order to facilitate such engagement the inner body member 218 is preferably formed of a plastics material such as nylon 66 or PEEK. In order to prevent any seepage of air into the gas passing through the pressure regulating valve 244, a further O-ring sealing member 256 is engaged between a top region (as shown) of the inner body member 218 and a wall of the cavity within the first external body member 210 in which the inner body member 218 is received.

The pin 250 is formed integral with or is connected to a hollow piston rod 258. The rod 258 is formed with a plurality of apertures 260 (of which one is shown in FIG. 2) such that in operation gas issuing from the orifice 240 is able to pass via the bore 246 through the apertures 260 into the interior of the hollow piston rod 258. The interior of the piston rod 258 thus forms a continuation of the axial passageway 232 and leads the gas to the shut-off valve 248.

The pressure-regulating valve 244 comprises an inner cap 262 housed within the second body member 212, the inner cap 262 being positioned over a collar 274 which is integral with the first body member 210 and defines part of the bore 246. A further gas space 270 is provided adjacent the shut-off valve 248 and is bounded in part by the second body member 212 and also in part by a piston head 266 connected to the piston rod 258. In operation, when the pressure regulating valve 244 is open gas passes from the orifice 240 into the gas space 246, through the apertures 260 and into the interior of the hollow piston rod 258 and from there into the gas space 270. The piston head 266 is operable to move in a third internal chamber 264 bounded by the second body member 212 between a position in which the pressure regulating valve 244 is open and a position in which the pin 250 closes the orifice 240 and hence the pressure regulating valve 244.

The piston head 266 is in a sealing engagement with the second body member 212 of the external valve body 208 via a piston head seal 268 in the form of an O-ring and the piston rod 258 is in a sealing engagement with the inner cap via a piston rod seal 272 also in the form of another O-ring located around the piston rod 258 within the inner cap 262. Typically, the sealing ring 272 is bonded to the inner cap 262. Even if not so bonded, displacement of the piston rod seal 272 would in any event be prevented the collar 274.

The pressure regulating valve 244 further comprises a compression spring 276 arranged within the external body 208 to bias the piston head 266 towards a position in which the pressure regulating valve 244 is open, the pin 250 failing to make a sealing engagement with the orifice 240. The compression spring 276 encircles the inner cap 262 and extends between the external surface of the inner cap 262 and a surface of the piston head 266. Typically a recess 278 is provided in the piston head 266 and the compression spring 276 extends between a surface of the inner cap 262 into the recess 278.

In operation, the pressure regulating valve 244 typically reduces the pressure of the gas from a storage pressure to a delivery pressure typically in the order of 1 to 3 bar. In order to facilitate this pressure reduction, the orifice 240 is typically of a narrow diameter, say in the range of 0.2-0.3 mm. The delivery pressure of gas remains relatively unaltered notwithstanding the fact that, in use, the pressure in the gas capsule 202 falls from a maximum value when full (say 190 bar) to a minimum value of approaching 1 bar when nearly empty. The arrangement of the pressure regulating valve 244 is such that in normal gas delivery operation a static equilibrium is achieved between forces acting in a valve-opening direction and forces acting in a valve-closing direction with the result that the pin 250 is maintained in a position in which the pressure regulating valve 244 is open. This position is illustrated in FIG. 3 of the drawings. The relationship between the pressure in the gas space 270 and the pressure in the gas space in the bore 246 when the pressure regulating valve 244 is in static equilibrium is as follows:

$$A_1 P_1 + (A_2 - A_1) P_2 F_S - P_2 A_3 = 0 \qquad \text{Equation 1}$$

where $A_1$ is the cross-sectional area of the orifice 240, $A_2$ is the cross-sectional area of the piston rod 258 contained within the piston rod O-ring 272. $A_3$ is the cross-sectional area of the piston head 266, $F_S$ is the force exerted by the compression spring 276, and $P_1$ and $P_2$ are the pressures at which the gas leaves the orifice 240 and enters the gas space 270, respectively.

From the above, it follows that the extent to which the pressure P2 varies at equilibrium as the pressure P1 varies is highly dependent upon the cross-sectional area A1 of the orifice 240. Equation 1 can be rearranged as follows:

$$P_2 = (A_1 P_1 + F_S)/A_3 - A_2 + A_1) \qquad \text{Equation 2}$$

It can be deduced from Equation 2 that it is desirable to make the value of A1 P1 relatively small in comparison with the value of FS so as to achieve a pressure regulating effect. The table below illustrates the diameter of the piston head 266 required to maintain the outlet or delivery pressure within plus or minus 5% of 3 bar as the pressure in the gas capsule falls from a maximum of 200 bar to a minimum of 10 bar.

| Orifice 240 Diameter/mm | Typical Piston Head 266 Diameter/mm |
| --- | --- |
| 0.1 | 2.8 |
| 0.2 | 5.7 |
| 0.3 | 8.5 |
| 0.4 | 11.3 |
| 0.5 | 14.1 |
| 0.6 | 17.0 |
| 0.7 | 19.8 |

It is to be understood from the Table that it is desirable to minimise the diameter of the piston head 266 in order to achieve good pressure regulation. It is therefore desirable to minimise the diameter of the orifice 240. We recommend an orifice diameter in the order of 0.3 mm because such a diameter can be achieved by standard manufacturing methods.

It is also follows from the static equilibrium equation that it is desirable to minimise the effective cross-sectional area A2 of the piston rod 258 as this value also has an effect on the required size and dimensions of the piston head 266 and therefore the overall dimensions of the valve 244 itself. The effective diameter of the piston rod 266 is minimised by fixing the position of the piston rod O-ring seal 272 within the inner cap 262 such that it does not move with the piston rod 258.

If the size of the orifice is no greater than 0.3 mm it is possible to keep the diameter of the valve 244 to below 20 mm.

If the shut-off valve 248 closes, for example, by removal of a member connecting the closure device 206 to a user device (not shown), the pressure in the bore 246 equalises with the pressure in the gas space 270 bounded in part by the piston head 266. As a result, the net force acting in a valve-closing direction becomes sufficient to overcome the bias of the compression spring 276 and the pressure regulating valve 244 closes. To assist with aligning the pin 250 with the orifice 240, when the pressure regulating valve 244 closes, the tip 254 of the pin 250 is chamfered to a point. As the pin 250 enters the orifice 240, the chamfered portion may bear against the surface at the mouth of the orifice 240 and this will have a centring action on the pin 250. It is therefore not normally possible for the tip 254 of the pin 250 to come into contact and cause any damage to the wall of the inner body member 218 defining the orifice 240.

The internal surface of the second body member 212 is, provided with a shoulder 280. The shoulder 280 limits the upward (as shown) travel of the piston head 266. The shoulder 280 ensures that when the shut-off valve 248 is open with a valve-member 282 (described below) extending into the gas space 270, there can be no contact between the valve member 282 and the piston head 266.

The closure device 206 has the following features to ensure that any excess pressure is safely vented to atmosphere. Should there, for example, be a build-up of gas pressure in the bore 246, the inner cap 262 is lifted away from the first body member 210 against the bias of the compression spring 276 and gas is allowed to escape past an O-ring sealing member 284 and flow out of the second body member 212 via the third internal chamber 264 and vent passages 286 provided in the second body member 212. In normal operation of the closure device 206, the O-ring seal 284 prevents such flow and venting of gas and this event occurs through, say, the apertures 260 in the piston rod 258 becoming blocked. On the other hand, should an excess pressure be created in the first internal chamber 214 (if, for example, the gas capsule itself is filled to too great a pressure) the first body member 210 is provided with a bursting disc 288 in communication with the first internal chamber 214. The bursting disc 288 is typically provided with an external cap 290 protecting the bursting disc 288 from external damage.

The previously mentioned shut-off valve 248 is provided at an upper region (as shown) of the closure device 206. The shut-off valve 248 typically comprises the previously-mentioned valve member (or head) 282 which when the shut-off valve 248 is in a closed position makes a sealing engagement with a valve seat 292, typically formed integrally with the second body member 212, via a shut-off O-ring valve seal 294. The valve member or head 282 is displaceable against the bias of a disc spring 296 to open the shut-off valve. In one typical arrangement, the valve member or head 282 is provided with an axial rod 299 which may be formed integral with the valve head 282. Engagement of a user device (not shown) with a port 298 at the outlet 236 of the closure device 206 can be arranged to cause an actuator (not shown) to bear against a rod 299 and force the valve member 282 out of engagement with valve seat 292 so as to permit gas to flow out of the closure device from the gas space 270. A gas pressure differential is thus created between the pressure in the gas space 270 and the pressure in the gas space sufficient for the pressure regulating valve 244 to open with the result that gas is able to be delivered from the capsule 202. Withdrawal of the actuator causes the bias of the disc spring 296 to close the shut-off valve 248. This in turn causes the pressure-regulating valve 244 to close.

The overall dimensions of the closure device 206 can typically be kept to not greater than 50 mm in height and not greater than 20 mm in maximum diameter. The closure device 206 is thus, for example, able to be fitted to and to close a standard pressurised gas capsule 202 of, say, approximately 20 ml water capacity without rendering it difficult to hold the capsule in the hand or carry it about one's person. Because the closure device 206 is able to regulate the pressure which gas is delivered from the capsule, it becomes available for a range of personal uses which have hitherto required a conventional gas cylinder which cannot readily be carried about ones person.

The closure device 206 is shown in FIG. 2 in its closed position and in FIG. 3 in its open position. The piston head 266 typically travels from 1-2 mm between the closed position and a fully open position. The valve member 282 may have a configuration which facilitates passage of gas in the open position. As shown in FIG. 3, it may have a chamfered surface 302 for this purpose, whereas in the embodiment shown in FIGS. 4 and 5, the valve member 282 is of a frusto-conical configuration for the same reason.

Figure 4:
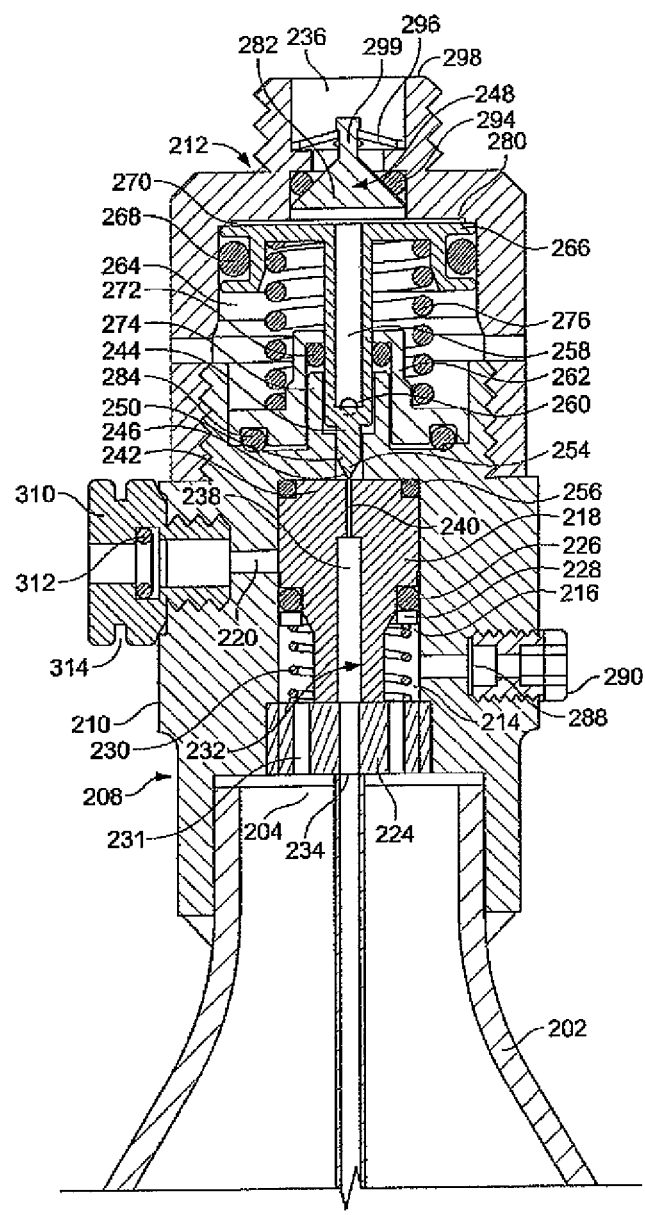
FIG. 4 is a schematic sectional elevation of a third embodiment of the kind of closure device shown in FIG. 1, the device being closed.
Figure 5:
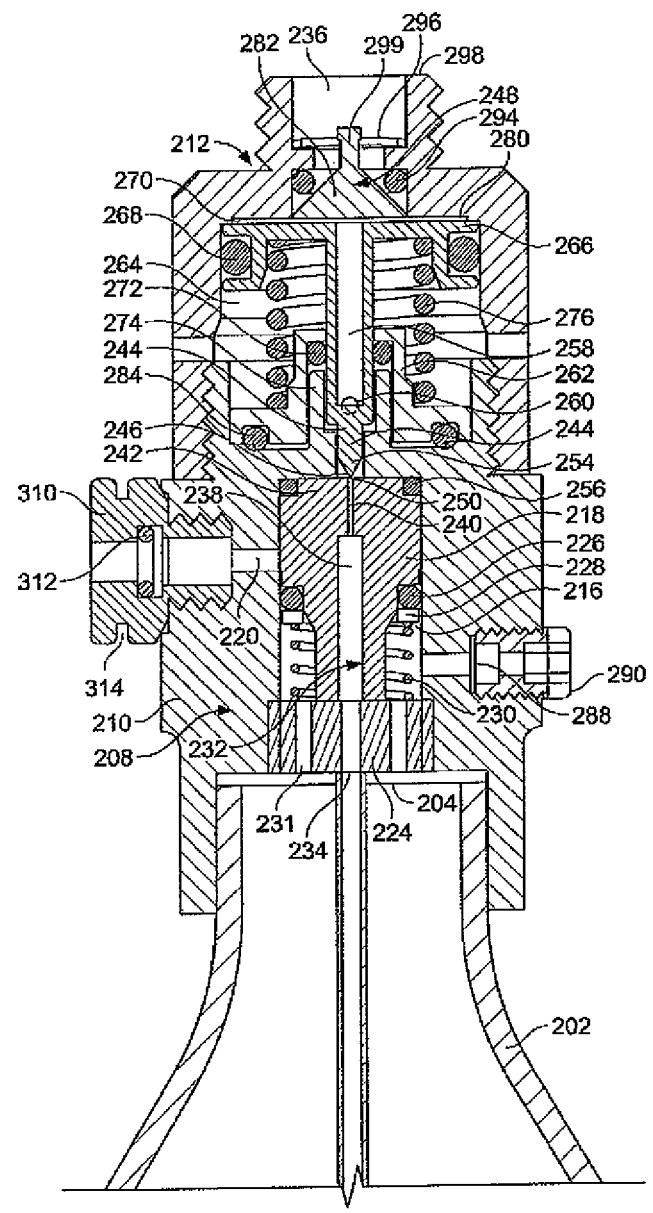
FIG. 5 is a schematic sectional elevation of the device shown in FIG. 4, but in the open position.

The embodiment shown in FIGS. 4 and 5 omits the nozzle 222. When it is required to replenish or refill the capsule 202, a probe 310 is inserted in the fill port 220. The probe 310 is provided with an internal sealing member 312 which is adapted to engage and seal a filling nozzle (not shown) at the end of a filling line (not shown). The probe 310 is provided with an external groove 314 which is able to receive a circular clamping member (not shown) to prevent accidental disconnection of the filling line from the probe 310.

In other respects, the embodiment of the closure device 206 shown in FIGS. 4 and 5 is essentially the same in configuration and operation as the embodiment shown in FIG. 2 or that shown in FIG. 3. In FIG. 4 the closure device 206 is shown in its closed position, and in FIG. 5, in its open position.

The invention claimed is:

1. A closure device for a container of compressed gas, the closure device comprising a shut-off valve and a pressure-reducing valve, and an external body housing the shut-off valve and the pressure-reducing valve, the external body being engageable with the container of compressed gas, wherein: (i) the external body comprises a first member including an inlet for the gas and being engageable with the container of compressed gas and a second member including an outlet for the gas and housing the shut-off valve, the closure device defining a passageway between the gas inlet and the gas outlet, (ii) the first member of the external body has a first internal chamber housing a fill valve including an inner body member, the first internal chamber communicating with the interior of the container when the closure device is in engagement therewith, (iii) the first member of the external body has a fill port communicating with the first internal chamber, and (iv) the inner body member defines part of said passageway and a seat for the pressure-reducing valve wherein the fill valve comprises a spring-loaded O-ring sealing member to seal the fill port from the interior of the container when the closure device is an engagement therewith, the O-ring sealing member being displaceable from its sealing position against the spring-loading by a gas pressure applied to the filling port.

2. A closure device according to claim 1, comprising a retaining nut for retaining the inner body member in position.

3. A closure device according to claim 1, wherein the first internal chamber communicates with a bursting disc housed in the first member of the external body.

4. A closure device according to claim 1, wherein the pressure-reducing valve comprises an inner cap housed within the external body, the inner cap bounding in part a second internal chamber within the external body, the second internal chamber being in communication with the gas inlet when the pressure-reducing valve is open; and a spring-loaded piston contained within the external body, the piston comprising a piston head and a piston rod, the piston rod including a conduit forming part of the passageway and providing communication between the second internal chamber and a gas space between the piston head and the shut-off valve, wherein the piston head is operable to move between a closed configuration in which the piston rod prevents communication between the gas inlet and the second internal chamber and an open configuration in which the piston rod permits communication between the gas inlet and the second internal chamber.

5. A closure device according to claim 4, when the piston head is in a sealing engagement with the first member of the external body via a piston head seal and the piston rod is in a sealing engagement with the inner cap via a piston rod seal contained within the second internal chamber, the piston rod seal being held in a fixed position within the second internal chamber.

6. A closure device according to claim 4, wherein the first member of the external body comprises a collar, and the piston rod seal is held between the collar and the inner cap.

7. A closure device according to claim 6, wherein the passageway extends through the collar.

8. A closure device according to claim 6, wherein the inner cap is in a sealing engagement with the first external body member via an inner cap seal, whereby build-up of pressure within the second internal chamber is operable to cause the sealing engagement to break, permitting gas within the second internal chamber to be vented via a relief aperture provided in the second external body member.

9. A closure device according to claim 4, wherein a first part of the passageway terminates in an orifice adjacent to the second internal chamber, and the piston rod comprises a sealing pin at an end remote from the piston head, the piston head being arranged within the external body so that the sealing pin seals the orifice when the piston is in the closed position.

10. A closure device according to claim 9, wherein the sealing pin has a tip which is chamfered to a point, and the piston rod is arranged within the external body so that the tip of the sealing pin enters into and seals the orifice when the piston is in the closed position.

11. A closure device according to claim 4, wherein the pressure reducing valve further comprises a compression spring arranged within the external body to bias the piston towards the open position.

12. A closure device according to claim 11, wherein the compression spring encircles the inner gap cap and extends between a surface of the inner gap and a surface of the piston head.

13. A closure device according to claim 1, wherein the shut-off valve comprises a spring-loaded head which when the shut-off valve is in a closed position makes a sealing engagement with a valve seat via a shut-off valve seal, but which is displaceable against the bias of the spring to open the shut-off valve.

14. A closure device according to claim 13 wherein the spring of the shut-off valve is a disc spring.

15. A closure device according to claim 1, wherein the device has a maximum diameter of less than 20 mm.

16. A container of compressed gas fitted with a closure device comprising a shut-off valve and a pressure-reducing valve, and an external body housing the shut-off valve and the pressure-reducing valve, the external body being engageable with the container of compressed gas, wherein: (i) the external body comprises a first member including an inlet for the gas and being engageable with the container of compressed gas and a second member including an outlet for the gas and housing the shut-off valve, the closure device defining a passageway between the gas inlet and the gas outlet. (ii) the first member of the external body has a first internal chamber housing a fill valve including an inner body member, the first internal chamber communicating with the interior of the container when the closure device is in engagement therewith, (iii) the first member of the external body has a fill port communicating with the first internal chamber, and (iv) the inner body member defines part of said passageway and a seat for the pressure-reducing valve wherein the fill valve comprises a spring-loaded O-ring sealing member to seal the fill port from the interior of the container when the closure device is an engagement therewith, the O-ring sealing member being displaceable from its sealing position against the spring-loading by a gas pressure applied to the filling port.

17. A container according to claim 16, wherein the closure device is in welded engagement with the container.

18. A container according to claim 17, wherein the container is a gas capsule having a water capacity of 5 ml up to 100 ml.

* * * * *